United States Patent [19]
Ward et al.

[11] Patent Number: 5,329,311
[45] Date of Patent: Jul. 12, 1994

[54] SYSTEM FOR DETERMINING NOISE CONTENT OF A VIDEO SIGNAL IN THE DISCLOSURE

[75] Inventors: Rabab K. Ward; Qin Zhang, both of Vancouver, Canada

[73] Assignee: The University of British Columbia, Vancouver, Canada

[21] Appl. No.: 59,378

[22] Filed: May 11, 1993

[51] Int. Cl.$^5$ ............... H04N 17/00; H04N 17/02
[52] U.S. Cl. ................................. 348/180; 348/193
[58] Field of Search .......... 358/139, 10, 133, 167; 382/57; 455/226.3; 348/192, 193, 180; H04N 17/00, 17/02, 17/04

[56] References Cited

U.S. PATENT DOCUMENTS

| | | | |
|---|---|---|---|
| 4,172,263 | 10/1979 | Tenten | 358/139 |
| 4,558,358 | 12/1985 | Onda | 358/139 |
| 4,628,360 | 12/1986 | Mook et al. | 358/139 |
| 4,721,997 | 1/1988 | Wittrock | 358/139 |
| 4,935,814 | 6/1990 | Omoto et al. | 358/139 |
| 5,073,822 | 12/1991 | Gumm et al. | 358/139 |
| 5,221,967 | 6/1993 | Ward | 358/139 |

OTHER PUBLICATIONS

A Measurement of Signal to Noise Ratio of a Television Broadcast Picture–IEEE Transaction on Broadway vol. 37 No. 2 Jun. 1991 C. D. Janst van Rensburg et al.

Primary Examiner—James J. Groody
Assistant Examiner—Chris Grant
Attorney, Agent, or Firm—C. A. Rowley

[57] ABSTRACT

A method of determining the noise content of a video signal by digitizing a frame based on the video signal to provide a digitized signal which is then filtered via a high pass filter. The filtered image is then divided into a plurality of subimages and the noise signal in each of the subimages is determined from a selected number of subimages having the lowest noise signal are further processed to determine the average noise in the selected subimages and the signal-to-noise ratio determined. The carrier-to-noise ratio may also be determined if desired.

15 Claims, 4 Drawing Sheets

SYSTEM FOR DETERMINING NOISE CONTENT OF A VIDEO SIGNAL IN THE DISCLOSURE

FIELD OF THE INVENTION

The present invention relates to a method of assessing the signal-to-noise ratio of TV images. More particularly the present invention relates to a method of determining the signal-to-noise ratio based on the assessment of noise in selected video frame (S).

BACKGROUND OF THE PRESENT INVENTION

The signal-to-noise ratio (SNR) and/or the carrier-to-noise ratio (CNR) in a cable television transmission picture are among the most important parameters characterising the performance of a cable network and the quality of the service being provided. The higher the signal-to-noise ratio obviously the better the quality of the picture that can be obtained. The Television Allocation Study Organization (TASO) have set a minimum for a grade 1 picture quality of at least 41 decibels (dB) and with the larger screen sizes now available it is likely that this ratio will be increased even further to maintain the quality of picture.

Picture tubes currently in use in the majority of television sets begin to shown poorer quality picture when the signal-to-noise ratio reaches about 40 (dB). It will be apparent that an effective system for monitoring the signal-to-noise ratio is important and will become even more important in the future to ensure transmission of better quality cable TV signals.

The signal-to-noise ratio of a cable network is currently measured by sending a test signal from the head end. This signal must be inserted during the vertical field retrace time and can only occupy a small portion of a frame. An acceptable measurement requires the averaging of the results obtained from processing of hundreds of consecutive frames of test signals as otherwise the results are unreliable.

In some cases the TV images may be impaired by snow noise before activation of a test signal in this case a high signal-to-noise ratio of a test signal still does not guarantee a good picture at the subscriber location as the transmitted signal already contained noise before activating the test signal at the head end, A portion of the bandwidth for each channel is used for band (channel) separation and does not carry a signal, rather the luminance signal (black and white portion of the signal) and the chrominance signal (coloured portion of the signal) are carried within the first ninety six percent of the band-width allocated to a particular channel leaving the remaining portion of band-width carrying no picture information. This limited portion of the band width for a given channel may be used to determine the signal-to-noise ratio without interfering significantly with the picture information. However, testing for signal-to-noise ratio in this unused portion of the band does not produce an accurate assessment of the signal-to-noise ratio of the actual interference in the remaining band portion carrying the information to produce the picture at the subscriber end.

In an article entitled "Measurement of Signal to Noise Ratio of a Television Broadcast Picture" by CD Janse Van Rensburg DeJageor, IEEE Transactions on Broadcasting, volume 37, No 2 pages 35 to 43, 1991 a method of using the high frequency content of a TV image to evaluate signal-to-noise ratio has been described. This method is limited to cartoon pictures or near constant luminance TV signals.

BRIEF DESCRIPTION OF THE PRESENT INVENTION

It is the object of the present invention to provide an improved system for measuring the signal-to-noise ratio of a TV signal or other picture.

Broadly the present invention relates to a method of determining the noise content of a video signal comprising digitizing a frame of said video signal to provide a digitized signal, subjecting said digitized signal to a high pass filter to remove the majority of said signal representing picture information in said frame and provide a filtered image, subdividing said filtered image into a plurality of subimages, determining noise signal in each of said subimages, selecting a selected number of subimages having the lowest noise signals, determining the signal-to-noise ratio based on the average noise in a said selected number of subimages.

Preferably one will further characterize the noise in said signal by determining the carrier-to-noise ratio.

Preferably said filtering will comprise convolving the digitized picture with the following 2nd order difference high pass filter:

$$h = \begin{bmatrix} \frac{1}{4} & -\frac{1}{2} & \frac{1}{4} \\ -\frac{1}{2} & 1 & -\frac{1}{2} \\ \frac{1}{4} & -\frac{1}{2} & \frac{1}{4} \end{bmatrix} \quad (1)$$

After high pass filtering, each pixel (i,j) in the filtered frame will have a value $y_{ij}$.

Preferably said high pass filter in the spectrum domain when N×N two dimensional fourier transform is used will be as follows:

$$H = 4\sin^2 \frac{\pi I}{N} \sin^2 \frac{\pi J}{N} \quad (2)$$

$I,J = 0,1,2 \ldots, N-1$

Preferably said selected number of subimages will be between two and five.

Preferably said snow noise will have an average value calculated as the average of snow noise calculated for selected subimages. The average snow noise in the case of a 32×32 pixel subimage is calculated in accordance with the following equation:

$$\bar{y}^2 = \frac{1}{32 \times 32} \sum_{i=0}^{i=31} \sum_{j=0}^{j=31} y_{ij}^2 \quad (3)$$

Wherein:
$\bar{y}$ of the average noise pixel value and
$y_{ij}$ is the pixel value after high pass filtering.

Preferably the signal-to-noise ratio is calculated using the following model:

$$SNR = 20\log \frac{255}{\sqrt{\bar{x}^2}} \quad (4)$$

wherein a pixel is assumed to take a value between 0 and 255 inclusive, and $\sqrt{\bar{x}^2}$ is defined as $$\sqrt{\overline{x^2}} = \sqrt{\overline{y^2}/2.25} \tag{5}$$

where the factor 2.25 is the filter amplifying effect on the white snow noise.

Preferably the carrier-to-noise ratio will be determined in accordance with $$CNR = 20\log \frac{1.6 \times 255}{\sqrt{\overline{x^2}}} \tag{6}$$

wherein $\sqrt{\overline{x^2}}$ is as defined above.

Preferably the carrier-to-noise ratio will be determined in accordance with the formula $$CNR = SNR + 4.1 dB \tag{7}$$

BRIEF DESCRIPTION OF THE DRAWING

Further features, objects and advantages will be evident from the following detailed description of the preferred embodiments of the present invention taken in conjunction with the accompanying drawings in which.

DESCRIPTION OF THE PREFERRED EMBODIMENT

Figure 1:
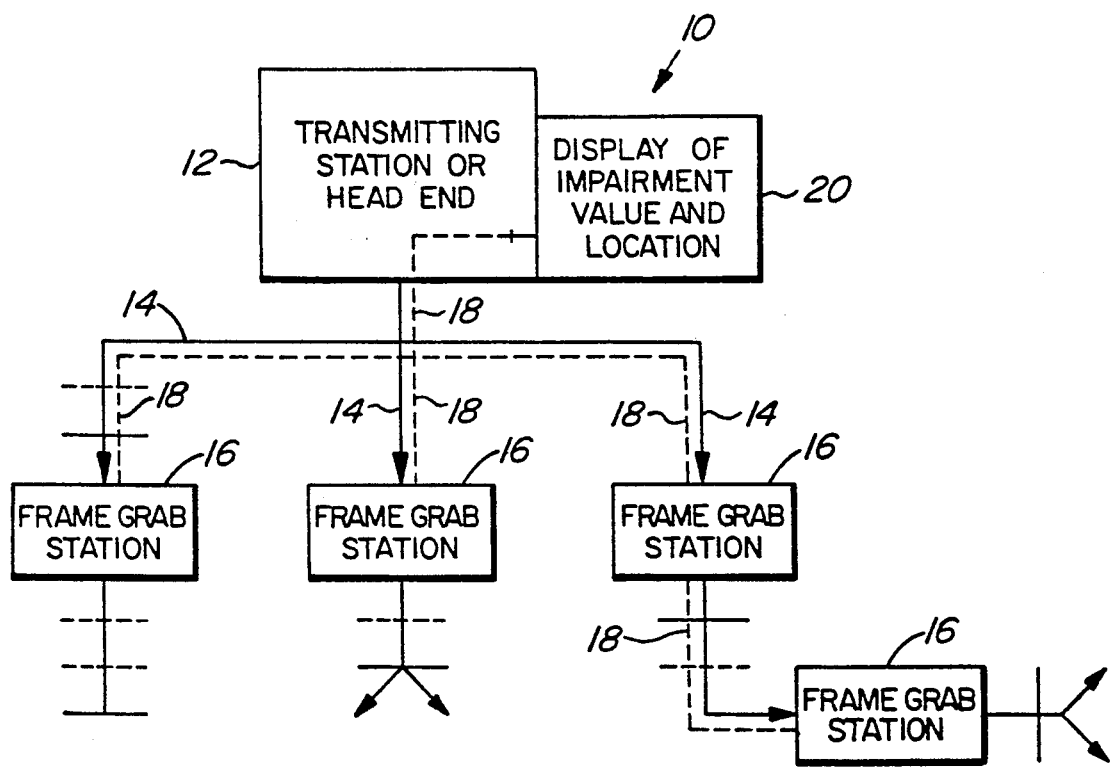
FIG. 1 is a typical layout of a cable system in which the present invention may be incorporated.
Figure 2:
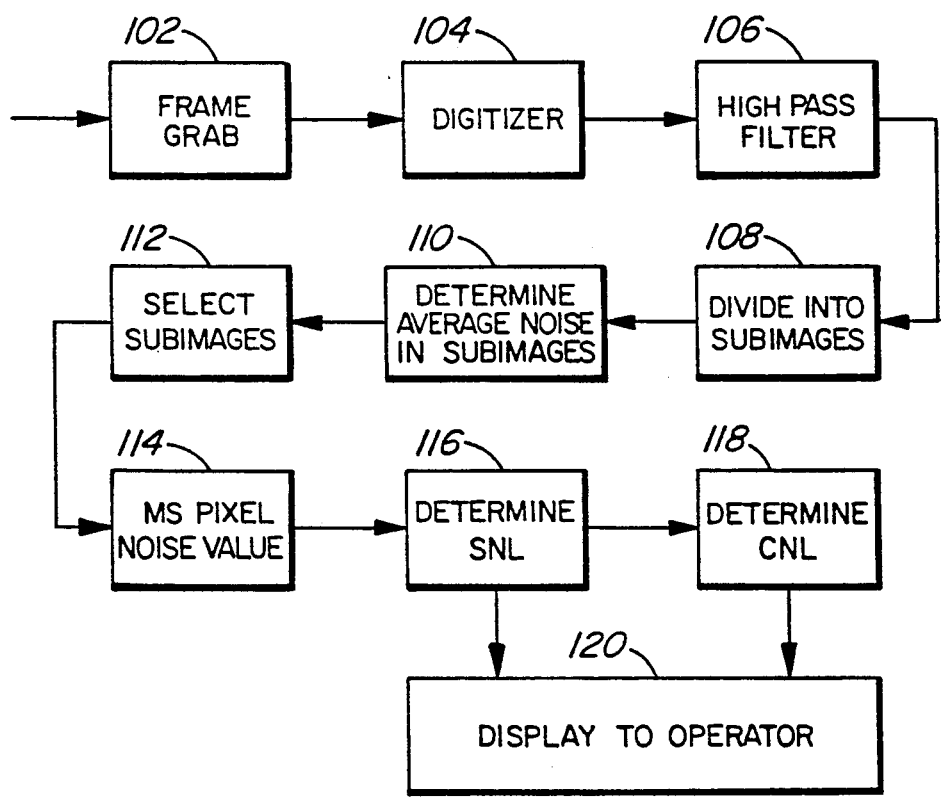
FIG. 2 is an illustration of the method of the present invention.

The present invention is generally indicated in FIGS. 1 and 2 with the cable transmitting system indicated in FIG. 1 at 10 and the signal quality monitoring system shown in FIG. 2.

The cable system is generally composed of a transmission station or head end 12 which transmits via a signal transmission line 14, television signals for a plurality of different channels to a plurality of different locations, i.e. users homes and the like where the television picture is viewed.

As above indicated impairments creep into the transmitted signal for various reasons and at various positions along the transmission path as defined by the transmission conductor systems represented by the lines 14. Frame grabber or monitoring stations as indicated 16 are provided at selected locations in the transmission system formed by the lines 14. These monitoring or frame grab stations 16 periodically grab a selected video frame signal being transmitted along the line 14 at that particular location to provide a video frame signal to be subjected to analysis.

The frame grab station 16 may perform various operations on the video frame signal or may recode the video frame signal and return it to the head end in for processing or may carry out all of the processing at the station 16 and code and transmit only the end results or findings back to the head end for further processing and display, i.e. the monitoring station 16 must be physically located at particular locations along the transmission path 14 for the signal however, image processing of the grabbed image may be performed wherever is most suitable, it being important that the information be communicated to the required location where it can be used which normally will be at the head end 12. Thus the frame grab or monitoring station 16 transmits information as indicated by the dotted lines 18 back to the head end so that the impairments and their locations can be displayed as indicated on the display module 20.

As shown in FIG. 2 the method or system of the present invention includes a frame grabber 102, a digitizer 104 that digitizes the grabbed frame. The digitized signal is then passed through a second order difference high pass filter 106 selected to filter out most of the picture content of the signal which usually lies in the centre low frequency region and to enhance the part of the random noise which lies in the outer or high frequency region. Usually TV pictures have frequencies concentrated in the central portion of the spectrum and do not spread to the very high frequency portion of the spectrum while frequencies of snow noise spread all over the spectrum domain. The high pass filter 106 must be carefully selected since if the filter stop band is too narrow the resulting filtered signal will not only contain random noise but may also include the high frequencies of the original picture which will not be filtered out. It has been found that the second order two-dimensional difference filter satisfies the criteria.

In the image domain ie the black and white portion of the signal the preferred second order difference filter selected is defined as $$h = \begin{bmatrix} \frac{1}{4} & -\frac{1}{2} & \frac{1}{4} \\ -\frac{1}{2} & 1 & -\frac{1}{2} \\ \frac{1}{4} & -\frac{1}{2} & \frac{1}{4} \end{bmatrix} \tag{1}$$

And in the spectrum domain it preferably will follow the following equations:

$$H = 4\sin^2 \frac{\pi I}{N} \sin^2 \frac{\pi J}{N} \tag{2}$$

$I, J = 0, 1, 2 \ldots, N-1$

Figure 3:
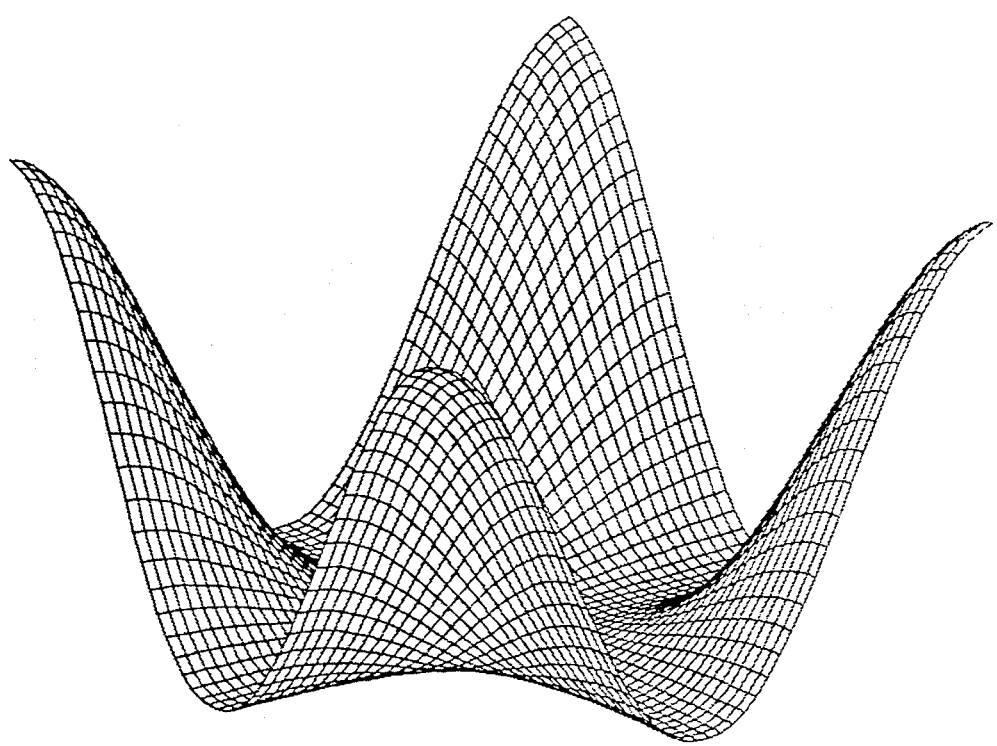
FIG. 3 is a three-dimensional plot of the high pass filter preferred for use in the present invention.
Figure 4:
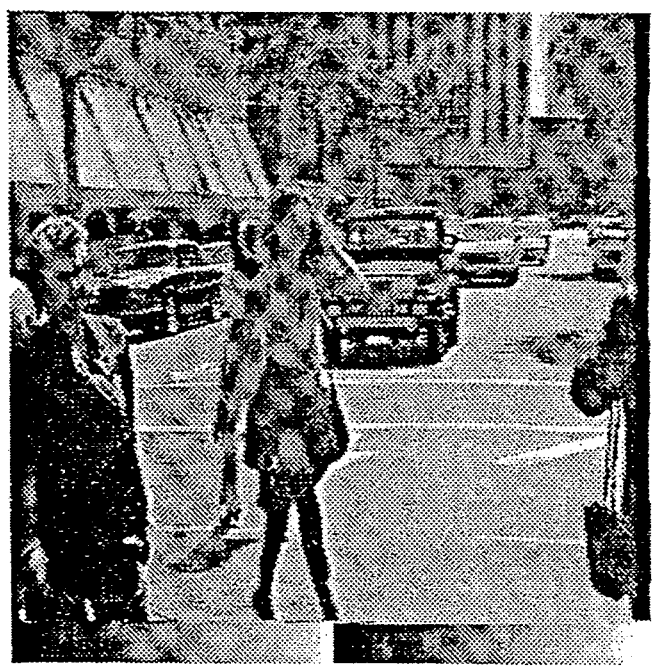
FIG. 4 illustrates a regular TV image with no snow noise.
Figure 5:
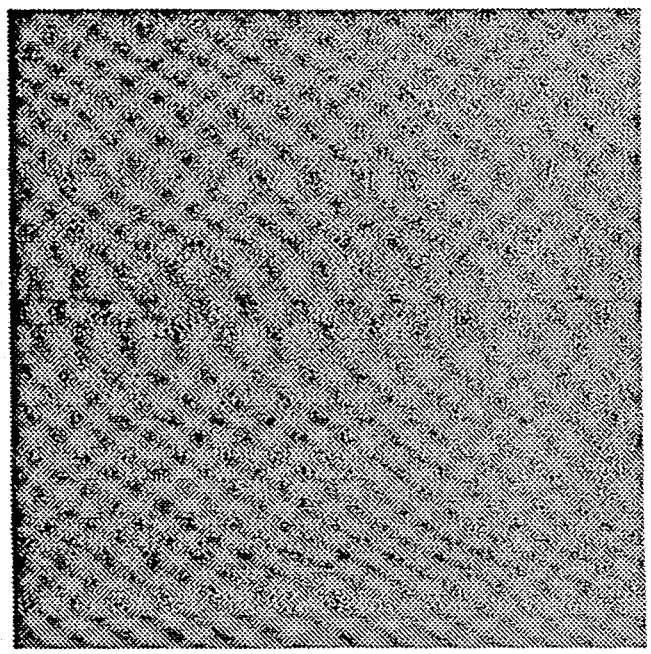
FIG. 5 shows the filtered image obtained after convolving FIG. 4 with the second order difference high pass filter wherein the majority of the original picture content has been removed.
Figure 6:
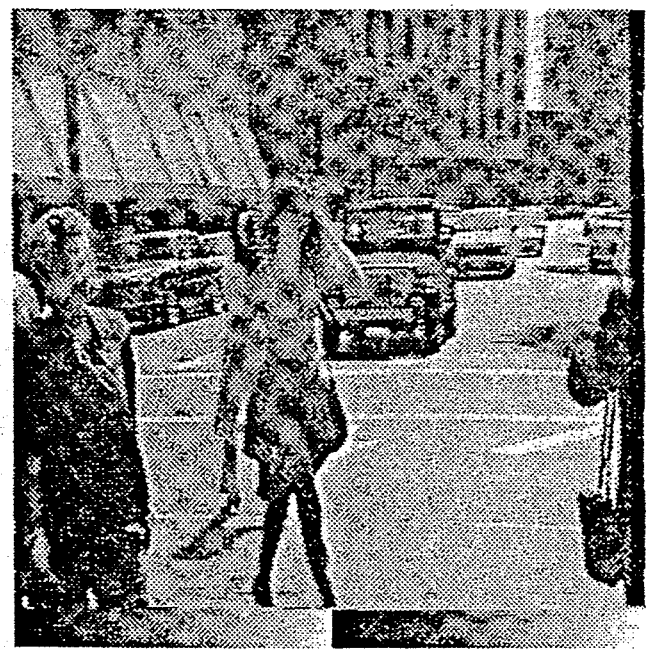
FIG. 6 shows a picture impaired by snow noise (28 dBs.)
Figure 7:
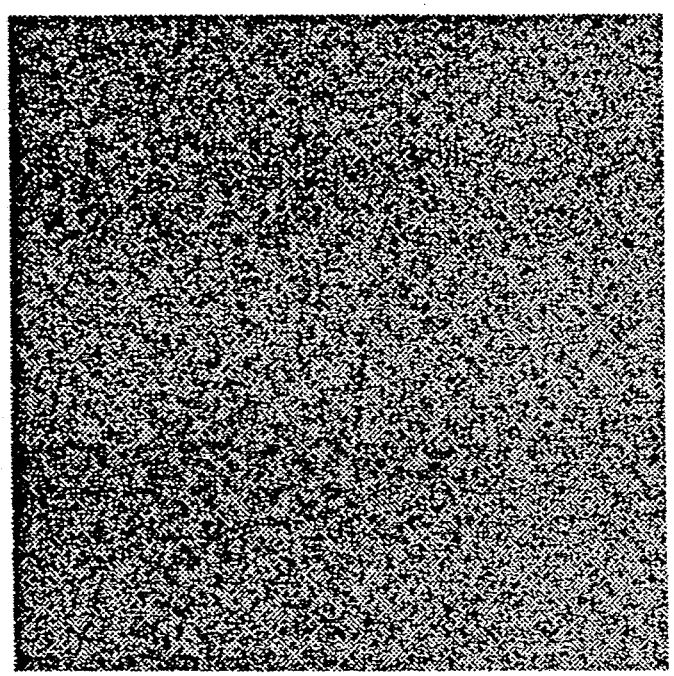
FIG. 7 shows the filtered image obtained after convolving FIG. 6 picture with the $2^{nd}$ order high pass filter wherein the contents of the snow noise has been enhanced but the vast majority of the original picture content has been removed.

A typical three-dimensional plot of this filter in the spectrum domain is shown in FIG. 3. As can be seen this filter filters out most of the picture content which lies in the centre low frequency regions and it enhances the random noise which lies in the outer high frequency regions. A regular TV image is shown in FIG. 4 and this same image after passing through a second order difference high pass filter used in the present invention is shown in FIG. 5. The majority of the original signal picture content has been removed in FIG. 5 and the residual unremoved image content are mainly the high frequency components.

To minimize the effect of these residuals the resulting digitized signal leaving the high pass filter 106 is divided into a plurality of subimages as indicated in 108 i.e. the image in FIG. 3 is divided into a plurality of blocks.

In the preferred system of the present invention a conventional frame which is composed of 512×480 pixels is divided into subimages containing 32 by 32 pixels each which produces a total of 240 images. It will be apparent that the size of each subimages need not be precisely as described however the number ie 240 subimage has been found to operate very well.

It is known that the average value of noise i.e. snow noise contributing to the signal of each of the subimages will be the same or substantially the same for all subimages. If a subimage originally did not contain high frequencies i.e. is a smooth part of the picture then after filtering, it will only contain the high frequencies of the noise. This noise value may be calculated by the following equation:

$$\bar{y}^2 = \frac{1}{32 \times 32} \sum_{i=0}^{i=31} \sum_{j=0}^{j=31} y_{ij}^2 \quad (3)$$

wherein
$\bar{y}$ of the average noise pixel value and
$y_{ij}$ is the pixel value after high pass filtering.

This step is carried out as indicated at 110 in FIG. 2 and should be carried further to remove the amplifying effect of the filter by determining the root mean square (rms) value of the pixel which given by;

$$\sqrt{\bar{x}^2} = \sqrt{\bar{y}^2/2.25} \quad (5)$$

Where the factor 2.25 is the filter amplifying effect on the white snow noise.

It will be apparent that the high frequency content of the picture image in some of the subimages will be significantly higher than in others since some parts of the image will be smooth and other parts will contain edges or abrupt changes in intensities. The effect of the picture content is minimized by dividing the image into subimages and selecting a preselected number of subimages having the smallest average value of $\sqrt{\bar{x}^2}$. The number of such subimages preferably will be in the range of 2 to 10. If the picture is not subdivided or if the number of subimages is not large enough the value for the noise per pixel will then still reflect the picture content i.e. the high frequency portion of the picture content of the signal Thus it is preferred to divide the image into a number of subimages, preferably at least 120 and the number of subimages selected to between 2 and 10 more preferably between 3 to 5. In the actual implementation of this invention four subimages out of 240 were selected which it is believed will guarantee a relatively accurate measurement of noise.

Selecting the subimages with the smallest average value of noise insures that the subimages selected have an image content that is homogeneous and smooth in their signals.

After finding the RMS of the noise level in the selected subimages as described in equation $$\sqrt{\bar{x}^2} = \sqrt{\bar{y}^2/2.25} \quad (5)$$

the signal-to-noise ratio may be determined by

The selection of the subimages with the lowest noise is indicated $$SNR = 20\log \frac{255}{\sqrt{\bar{x}^2}} \quad (4)$$

schematically at 112, the calculation of root mean square at 114 and the signal-to-noise ratio is determined as indicated at 116 in FIG. 2 and displayed at 120.

A more useful number to the TV technician for cable TV measurement is the carrier-to-noise ratio (CNR) obtained as indicated at 118 and displayed at 120.

Since the active image content is known as 100IRE (IRE scale) the synchronization tip is 40IRE and the maximum level is according to the current thinking 20IRE we find the carrier-to-noise ratio to be $$CNR = 20\log \frac{1.6 \times 255}{\sqrt{\bar{x}^2}}$$
$$= SNR + 4.1 \text{ dB}$$

EXAMPLES

In order to test the present invention real TV programs were used and 11 digitized movie images with different picture contents were examined. The test results are given in Table 1 and the picture illustrated in FIG. 4 is Julie. These pictures are clean (noise free) and their SNR are at least 50 dbs.

TABLE 1

| Picture Name | SNR (by van Rensburg et al.) dB | SNR (by the invention) dB |
|---|---|---|
| hotel | 40.4 | 50.7 |
| bath | 40.0 | 52.3 |
| bmw | 40.8 | 52.7 |
| char | 41.2 | 51.1 |
| drink | 41.3 | 51.3 |
| Edward | 40.1 | 50.4 |
| Julie | 40.0 | 51.6 |
| lotus | 41.7 | 52.5 |
| meeting | 40.5 | 50.7 |
| pool | 40.3 | 50.8 |
| shopping | 40.5 | 50.5 |

It can be seen from Table 1 that the lowest signal-to-noise ratio indicated was 50.4 and the highest was 52.7. This may be compared with the prior art technique using the two-dimensional transform described by the Van Resnburg et al. in the IEEE reference referred to above.

The signal-to-noise ratio predicted by Van Resnburg varied from about 40 dBs to 41.7 dBs and were too low since the SNR's should be above about 50 dBs and this technique could not be used effectively to analyze even the clean signals.

Next computer simulated snow noise was added to the noise free pictures tested in Table 1 and the effects measured. The results are listed in Table 2

TABLE 2

| Noise Level | SNR (by the invention) | SNR (actual) | Error (theory by the invention |
|---|---|---|---|
| 1 | 46.6 dB | 48.1 dB | 1.5 dB |
| 2 | 42.2 dB | 42.1 dB | −0.1 dB |
| 4 | 36.8 dB | 36.1 dB | −0.7 dB |
| 8 | 30.9 dB | 30.1 dB | −0.8 dB |
| 16 | 25.0 dB | 24.0 dB | −1.0 dB |

TABLE 2-continued

| Noise Level | SNR (by the invention) | SNR (actual) | Error (theory by the invention) |
|---|---|---|---|
| 32 | 19.0 dB | 18.0 dB | −1.0 dB |

It can be seen that the measurements obtained using the present invention based on the actual values of signal-to-noise ratio are very accurate (within less than 1.5 dBs).

The above described method provides a simple yet effective method of measuring the signal-to-noise ratio or if desired the carrier-to-noise ratio for a conventional TV transmission from the picture itself i.e. without interrupting the transmitter or requiring the application of special signals. With proper hardware the signal-to-noise ratio or carrier-to-noise ratio of an active TV program can be analyzed using the present invention in real time to provide relatively accurate results indicating the signal-to-noise or carrier-to-noise ratio.

If further accuracy is desired instead of using only one video frame many different video frames may be used. The picture content of the different frames will vary while the amount of snow noise will not, thus the second order difference filter will effectively filter out all picture content and retain the random snow noise.

Having described the invention modifications will be evident to those skilled in the art without departing from the scope of the invention as defined in the appendant claims.

We claim:

1. A method of determining the noise content of a video signal comprising digitizing a frame of said video signal to provide a digitized signal, subjecting said digitized signal to a high pass filter to remove the majority of said signal representing picture information in said frame and provide a filtered image, subdividing said filtered image into a plurality of subimages, determining noise signal in each of said subimages, selecting a selected number of subimages having the lowest noise signals, determining the signal-to-noise ratio based on the average noise in said selected number of subimages.

2. A method as defined in claim 1 wherein said signal-to-noise ratio is further used to determine the carrier-to-noise ratio.

3. A method as defined in claim 1 wherein said filtering comprises convolving said digitized frame with the following filter:

$$h = \begin{bmatrix} \frac{1}{4} & -\frac{1}{2} & \frac{1}{4} \\ -\frac{1}{2} & 1 & -\frac{1}{2} \\ \frac{1}{4} & -\frac{1}{2} & \frac{1}{4} \end{bmatrix} \quad (1)$$

4. A method as defined in claim 3 wherein said high pass filter in the spectrum domain will be as follows:

$$H = 4\sin^2 \frac{\pi I}{N} \sin^2 \frac{\pi J}{N} \quad (2)$$

$$I, J = 0, 1, 2 \ldots, N-1$$

5. A method as defined in claim 4 wherein said noise will have an average value calculated (based on each sub image being 32×32 pixels) in accordance with the following equation:

$$\bar{y}^2 = \frac{1}{32 \times 32} \sum_{i=0}^{i=31} \sum_{j=0}^{j=31} y_{ij}^2 \quad (3)$$

wherein
$\bar{y}$ is the average noise pixel value and
$y_{ij}$ is the pixel value after high pass filtering.

6. A method as defined in claim 5 wherein the signal-to-noise ratio is calculated using the following model:

$$SNR = 20\log \frac{255}{\sqrt{\bar{x}^2}} \quad (4)$$

wherein $\sqrt{\bar{x}^2}$ is defined as $$\sqrt{\bar{x}^2} = \sqrt{\bar{y}^2/2.25} \quad (5)$$

7. A method as defined in claim 6 wherein a carrier-to-noise ratio is determined in accordance with $$CNR = 20\log \frac{1.6 \times 255}{\sqrt{\bar{x}^2}} \quad (6)$$

wherein $\sqrt{\bar{x}^2}$ is defined as $$\sqrt{\bar{x}^2} = \sqrt{\bar{y}^2/2.25} \quad (5)$$

8. A method as defined in claim 6 wherein a carrier-to-noise ratio is determined in accordance with the formula $$CNR = SNR + 4.1 \text{ dB}$$

9. A method as defined in claim 1 wherein said selected number is between two and five.

10. A method as defined in claim 3 wherein said selected number is between two and five.

11. A method as defined in claim 4 wherein said selected number is between two and five.

12. A method as defined in claim 5 wherein said selected number is between two and five.

13. A method as defined in claim 6 wherein said selected number is between two and five.

14. A method as defined in claim 7 wherein said selected number is between two and five.

15. A method as defined in claim 8 wherein said selected number is between two and five.

* * * * *